United States Patent [19]

Gulczynski

[11] Patent Number: 5,164,657

[45] Date of Patent: Nov. 17, 1992

[54] SYNCHRONOUS SWITCHING POWER SUPPLY COMPRISING BUCK CONVERTER

[76] Inventor: Zdzislaw Gulczynski, P.O. Box 11633, Costa Mesa, Calif. 92627

[21] Appl. No.: 363,325

[22] Filed: Jun. 8, 1989

Related U.S. Application Data

[63] Continuation of Ser. No. 229,915, Aug. 8, 1988, Pat. No. 4,853,837.

[51] Int. Cl.$^5$ .............................................. G05F 1/565
[52] U.S. Cl. ................................... 323/275; 323/285; 323/299; 323/349
[58] Field of Search .............................. 363/21, 70, 97; 323/222, 223, 265, 273, 274, 275, 282–285, 299, 303, 349

[56] References Cited

U.S. PATENT DOCUMENTS

| | | | |
|---|---|---|---|
| 4,556,838 | 12/1985 | Brasseur | 323/299 X |
| 4,678,983 | 7/1987 | Rouzies | 323/222 |
| 4,736,286 | 4/1988 | Gulczynski | 363/70 |
| 4,803,610 | 2/1989 | Gulczynski | 363/70 |
| 4,814,687 | 3/1989 | Walker | 323/275 |
| 4,835,454 | 5/1989 | White | 323/222 |
| 4,853,837 | 8/1989 | Gulczynski | 323/222 X |

Primary Examiner—Steven L. Stephan
Assistant Examiner—Emanuel Todd Voeltz

[57] ABSTRACT

The synchronous switching power supply can be employed in multiple output power supply systems requiring extremely high efficiency and low number of components. The input signal may be AC or pulsating DC. A single switch is switched at zero voltage and current. The short circuit protection is inherent. A switching power supply with buck converter includes a switch for selectively applying the input signal of one polarity to a node, an inductor coupled to the node for attaining a current, a rectifier coupled between the node and ground for conducting the current, a capacitor coupled between the inductor and ground for providing the output signal, a first comparator for comparing the input signal against a first signal, a second comparator for comparing the output signal against a second signal, and a control circuit responsive to the first and second comparators for controlling the switch.

5 Claims, 5 Drawing Sheets

SYNCHRONOUS SWITCHING POWER SUPPLY COMPRISING BUCK CONVERTER

This application is a file wrapper continuation of prior application Ser. No. 229,915 filed on Aug. 8, 1988, now U.S. Pat. No. 4,853,837.

CROSS REFERENCE TO RELATED INVENTIONS

This application is related to: "Ultra Efficient Switching Power Amplifier"
"Power Switch Driver" Ser. No. 229,914 filed on Aug. 8, 1988;
"High Efficiency Power Amplifier
Comprising Multilevel Power Supply"
Ser. No. 180,433 filed on Apr. 12, 1988;
"Switching Power Amplifier"
U.S. Pat. No. 4,763,080 dated Aug. 9, 1988;
"Switching Circuits Performing Thyristor and Triac Functions"
Ser. No. 053,635 filed on May 26, 1987;
"Switching Power Supply"
U.S. Pat. No. 4,803,610 dated Feb. 7, 1989;
"Switching Power Supply"
U.S. Pat. No. 4,736,286 dated Apr. 5, 1988; and
"Push-Pull Power Amplifier"
U.S. Pat. No. 4,476,441 dated Oct. 9, 1984.
All inventions are by the same inventor.

BACKGROUND OF THE INVENTION

The invention relates to synchronous switching power supplies (SPS), particularly for multiple output power supply systems requiring extremely high efficiency and low number of components. SPSs are generally electrical energy regulators which change electrical signals from one form to another by the use of high speed switching components.

The efficiency is improved essentially by reducing the number of semiconductor power devices and inductive parts. The efficiency is further increased by adequately operating the power components. For instance, switching a power transistors at zero voltage and/or current is beneficial. Old fashion SPSs convert AC energy source, e.g. line, into DC voltage which causes inrush current and surge currents every peak of the AC voltage. Pulse width modulation (PWM) is used which results in numerous problems including high circuit complexity, stability problems and significantly higher effective switching frequency. Power factor correction circuits are employed which further increase complexity and decrease efficiency. An exemplary approach to a high efficiency SPS is disclosed in the abovementioned U.S. Pat. No. 4,736,286 entitled "Switching Power Supply" dated Apr. 5, 1988, by the same inventor. This SPS converts AC signal into AC and/or DC signal while employing a minimum number of switching and inductive components. A sinusoidal input current is inherent.

High power SPSs with a plurality of outputs provide one accurately regulated output. The remaining outputs require a further regulation due to a poor tracking of the power transformer and mismatch of power rectifiers. AC output signals are converted into DC signals. Employment of linear regulators results in a very poor efficiency. Switching regulators must be synchronized with the main SPS. A minimum internal load is required to ensure proper operation with no external load.

Conventional SPSs employ an isolating transformer with one output winding for each output of one polarity. A capacitor is coupled to the output via a rectifier. In forward type converters, charging the capacitor results in surge currents which are even higher when a single capacitor is used to supply a plurality of output regulators. The surge currents occur at worst possible time, i.e. when power switches of the main SPS are being turned on.

Low output voltages are commonly desired. Therefore, most of power losses are caused by the forward losses of the output rectifiers. Moreover, snubbers coupled thereacross are required to prevent parasitic oscillations and high voltage spikes during reverse recovery time. One or two diodes are used for each output employing a switching regulator.

SUMMARY OF THE INVENTION

The present invention is intended to provide an SPS having an extremely high efficiency and low number of components. SPS is inherently synchronous. The input signal may be AC or pulsating DC. A single switch is switched at zero voltage and current. The short circuit protection is inherent. The SPS can operate with virtually any SPS providing an AC or pulsating DC output.

An SPS according to the present invention converts AC or pulsating DC input signal into output signal and comprises a node, a switch means for selectively applying the input signal of one polarity to the node, an inductive means coupled to the node for attaining a current, a rectifying means coupled between the node and ground for conducting the current, a capacitive means coupled between the inductive means and ground for providing the output signal, a first comparator means for comparing the input signal against a first signal, a second comparator means for comparing the output signal against a second signal, and a control means responsive to the first and second comparator means for controlling the switch means.

In another embodiment SPS converts AC or pulsating DC input signal applied to input thereof into output signal and comprises a node, an inductive means coupled to the node for attaining a current, a switch means coupled to the node for selectively applying the input signal of one polarity across the inductive means, wherein the inductive means and switch means are separately coupled to the input and ground in either order, a capacitive means coupled to ground for providing the output signal, a rectifying means coupled between the node and capacitive means for conducting the current, a first comparator means for comparing the input signal against a first signal, a second comparator means for comparing the output signal against a second signal, a means for determining an optimum value of the current, and a control means responsive to the first comparator means, second comparator means and means for determining, for controlling the switch means.

In yet another embodiment SPS includes a third comparator means for determining a minimum value of the current by sensing a voltage appearing across the rectifying means, wherein the control means is responsive to the third comparator means.

There are three basic configurations for converting a predetermined DC input voltage into a desired DC output voltage. Assuming positive input voltage, three components of these converters are connected to the input, ground and output, respectively:

buck converter—switch, anode of a diode and inductor;

boost converter—inductor, switch and cathode of a diode; and flyback converter—switch, inductor and anode of a diode.

BRIEF DESCRIPTION OF THE DRAWINGS

The present invention will become more clear in conjunction with the accompanying figures of which.

Throughout the drawings similar references denote similar parts.

DETAILED DESCRIPTION OF THE INVENTION

Figure 1:
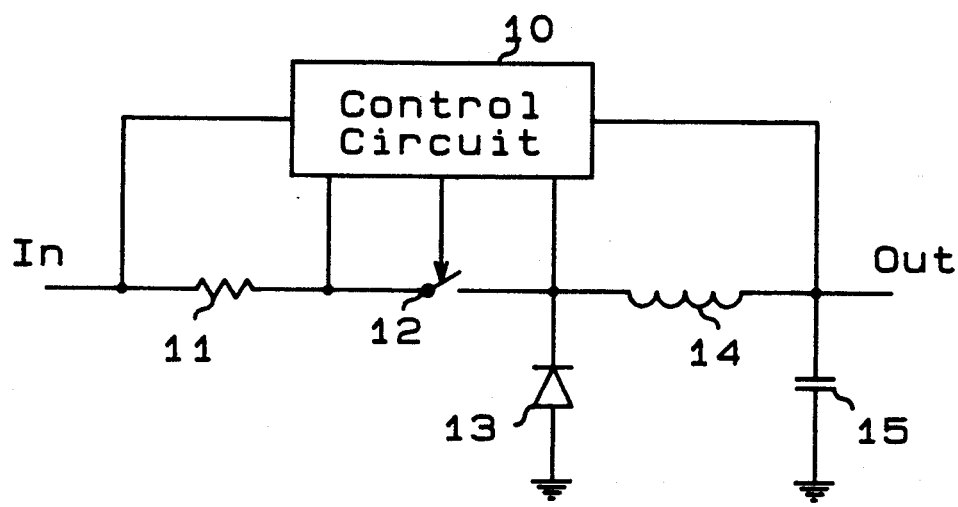
FIG. 1 is a block diagram of the embodiment with buck converter.

FIG. 1 is a block diagram of the embodiment with buck converter, referred to as buck SPS. AC or pulsating DC voltage is applied to the SPS input In. The unidirectional switch 12 is coupled thereto via the resistor 11 and further to a node for selectively applying the input signal of one polarity thereto. The inductor 14 is coupled between the node and output Out for attaining a current. The diode 13 is coupled between the node and ground for conducting the inductor current. The capacitor 15 is coupled between the output and ground for providing the SPS output signal.

The control circuit 10 monitors the input voltage, output voltage, voltage across the resistor 11 and diode 13 as to control the switch 12. Generally, the switch 12 is turned on when the input voltage is becoming higher than the output voltage while a higher value thereof is desired. The optional resistor 11 is employed when the short circuit protection is desired. The resistor 11 can be coupled in series with the switch 12 or inductor 14 for obtaining a voltage in response to the inductor current.

Figure 2:
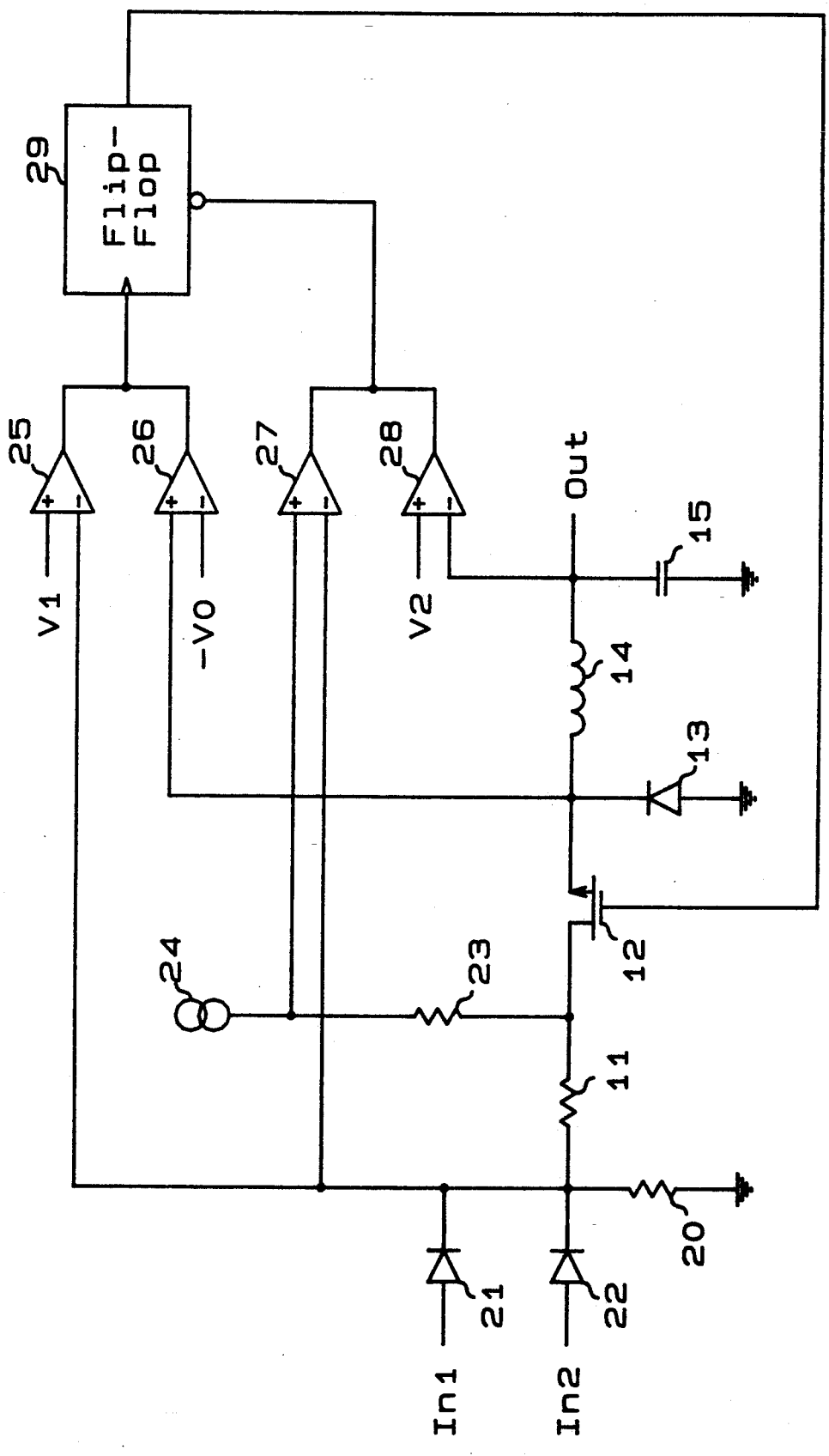
FIG. 2 is a schematic diagram of the embodiment with buck converter.

FIG. 2 is a schematic diagram of the embodiment with buck converter, i.e. buck SPS. The components 11 thru 15 are coupled and operate as the respective components of FIG. 1, having the same reference numbers. The input signal is applied to the inputs In1 and In2 and is fully rectified by the diodes 21 and 22 respectively coupled in series therewith. In1 and In2 can be connected to a secondary winding of a transformer having a center tap coupled to ground.

The comparators 25 thru 28 monitor the input voltage, voltage across the diode 13 and resistor 11, and output voltage respectively. Specifically, the comparator 25 compares the rectified input voltage against the voltage V1. Similarly, the comparator 28 compares the output voltage against the voltage V2. The comparators 26 and 27 monitor voltages across the diode 13 and resistor 11 respectively. The comparator 26 has a predetermined offset voltage equal to the negative voltage —V0. The comparator 27 has a predetermined offset voltage set by the voltage drop across the resistor 23 coupled between the current source 24 and drain of the transistor 12.

Each of the comparators has a noninverting and inverting inputs and open collector output. The voltages V1 and V2 are applied to noninverting inputs of the comparators 25 and 28 respectively. The inverting inputs thereof are coupled to the rectified input and output of the SPS respectively. The noninverting and inverting inputs of the comparator 26 are coupled to the cathode of the diode 13 and voltage —V0 respectively. The noninverting and inverting inputs of the comparator 27 are coupled to the current source 24 and rectified input respectively.

The flip-flop 29 is triggered on a positive edge of a signal when a reset signal is high and is reset when the reset signal is low. The output of a comparator is high when a sink current thereof is zero. The outputs of the comparators 25 and 26 are tied together, whereby the positive edge signal is provided when one output is changing from low to high while the other output is high. Similarly, the outputs of the comparators 27 and 28 are tied together, whereby the reset signal is high when both outputs are high. In order to turn the transistor 12 on and off an adequate voltage is provided to the gate thereof by the flip-flop 29 which is triggered and reset respectively.

The transistor 12 has the drain receiving the rectified SPS input signal via the resistor 11, source coupled to the diode 13 and inductor 14, and gate coupled to the output of the flip-flop 29. The transistor 12 is on when the drain voltage is higher than the source voltage and the flip-flop 29 is triggered, and is off in any other case. The conducting transistor 12 causes a current of the inductor 14. The voltage across the capacitor 15 is increased when the inductor current is higher than the output current of the SPS. If the capacitor voltage becomes higher than the voltage V2, the flip-flop 29 is reset. This turns the transistor 12 off, whereby the diode 13 takes over the inductor current.

While the diode 13 is conducting the inductor current, the voltage thereacross is negative with reference to ground. When the inductor current is zero, the diode voltage is equal to the positive SPS output voltage. The polarity of the diode voltage is sensed by the comparator 26. In particular, if transistor 12 is off and the diode voltage is positive, the output current of the comparator 26 is zero. The flip-flop 29 is triggered when the rectified input voltage is below V1 and inductor current is zero. Therefore, the transistor 12 is switched at zero drain-source voltage and zero drain current. The diode voltage is compared against a small negative voltage —V0 so that the SPS operates properly even at zero output voltage.

The inductor current is also conducted by the resistor 11. The voltage thereacross is sensed by the comparator 27 as to determine an excess of the inductor current, i.e. short circuit current. Specifically, the output of the comparator 27 is low when the voltage across the resistor 11 is higher than across resistor 23. By these means the flip-flop 29 is reset when the inductor current has reached the short circuit current. The connection of the resistor 11 in series with transistor 12 rather than inductor 14 is preferred so that the resistor 11 conducts the inductor current and dissipates power only when the transistor 12 is on.

The SPS is inherently synchronized by means of the comparator 25. The flip-flop 29 can be triggered when the rectified input voltage of the SPS is changing the polarity with reference to the voltage V1. In the embodiment shown in FIG. 2, the flip-flop 29 is triggered when the rectified input voltage is below V1 and the zero current is detected, whichever occurs last. The voltage V1 is positive and smaller than V2. V1 can not have just any positive value since MOSFETs usually have a parasitic drain-source diode and the voltage drop thereacross may determine the drain voltage. Therefore, the drain voltage of the transistor 12 may be only slightly smaller than the SPS output voltage when the inductor current is zero. The voltage V1 may be obtained simply as a portion of V2 by means of a resistor divider.

The input signal of the SPS is AC or pulsating DC. For instance, the signal may be substantially an AC square wave deriving from an isolating transformer. Due to a limited response time thereof a voltage falling below V1 for a very short period of time is attained after the full rectification by the diodes 21 and 22. If the reverse recovery time thereof is too high, a pair of additional low power high speed diodes can be employed for the inverting input of the comparator 25. Also coupled thereto is the resistor 20 to minimize effect of parasitic capacitances. The transistor 12 is turned on at zero voltage, zero current and when the SPS output voltage is below V2. The flip-flop 29 is reset to turn transistor 12 off before one pulse ends or after several pulses of the SPS input signal.

Figure 3:
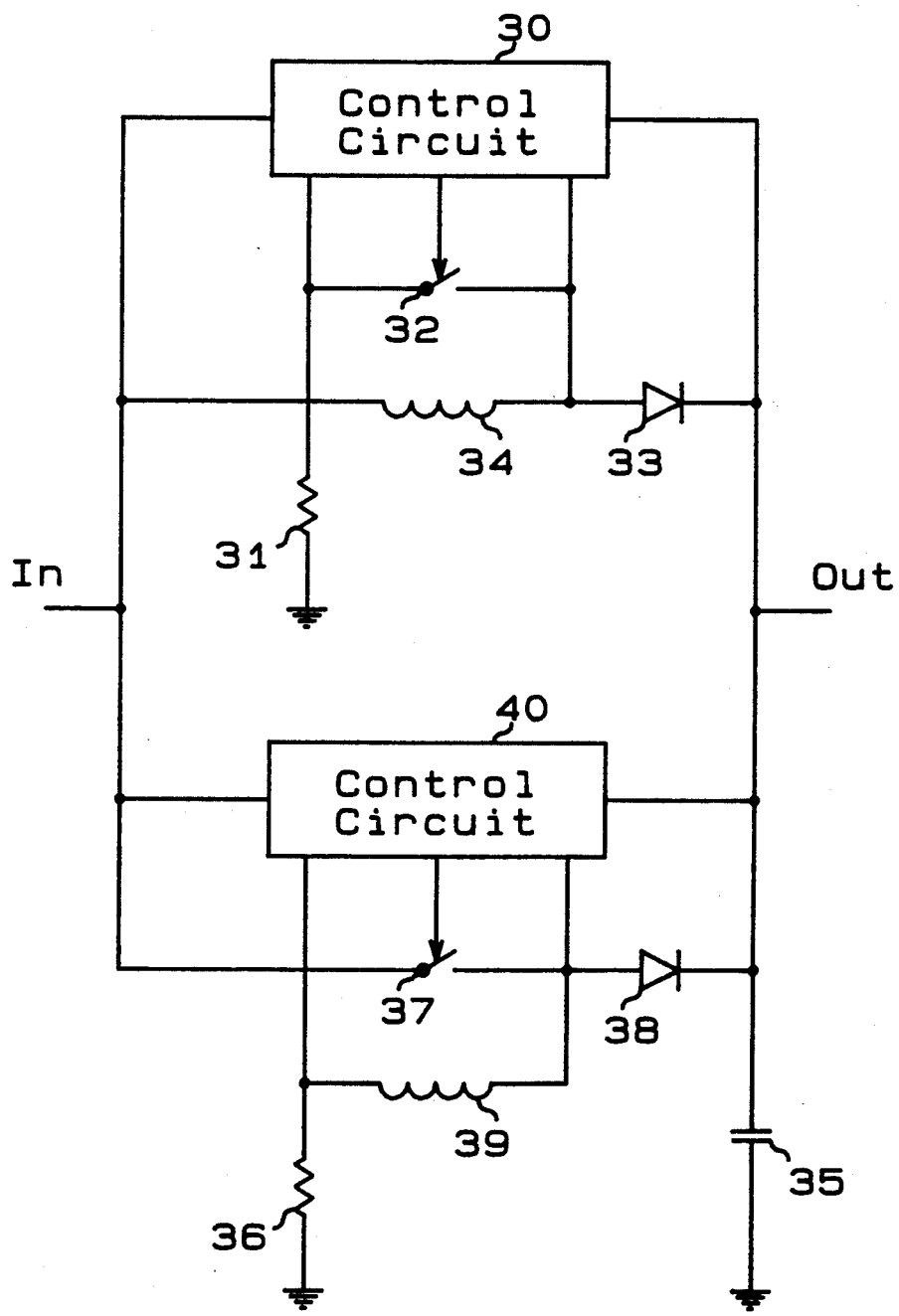
FIG. 3 is a block diagram of the embodiment with boost and flyback converters.

FIG. 3 is a block diagram of the embodiment with boost and flyback converters, referred to as boost and flyback SPSs respectively. AC signal is applied to the SPS input In. The boost SPS includes the inductor 34 coupled between the input and node. The unidirectional switch 32 is coupled between the node and ground for selectively applying the input signal of one polarity across the inductor 34. The diode 33 is coupled between the node and output for conducting the inductor current. The capacitor 35 is coupled to the output for providing the output signal of the SPS. Generally, the switch 32 and inductor 34 are separately coupled to the SPS input and ground in either order. Therefore, the flyback SPS is obtained by exchanging the switch 32 for inductor 34. In particular, the components 32 thru 34 of the boost SPS correspond to 37 thru 39 of the flyback SPS respectively.

The optional resistors 31 and 36 are employed in connection with means for determining an optimum value of the respective inductor currents by direct sensing thereof. Either resistor can be coupled in series with the respective inductor or switch for obtaining a voltage in response to the inductor current. However, the power dissipation of the resistor 31 is reduced due to the coupling thereof in series with the switch 32. Furthermore, the resistor 31 is coupled to ground, whereby the control circuit 30 is simpler. Consequently, coupling the resistor 36 in series with the switch 37 would result in reduced power dissipation, however the control circuit 40 would be more complex.

The control circuit 30 of the boost SPS monitors the input voltage, output voltage, voltage across the resistor 31 and diode 33 as to control the switch 32. Similarly, the control circuit 40 of the flyback SPS monitors the input voltage, output voltage, voltage across the resistor 36 and diode 38 as to control the switch 37. Generally, the switches 32 and 37 are turned on at zero crossing of the input voltage while a higher value of the output voltage is desired.

The boost and flyback SPSs operate when the input voltage is positive and negative respectively. The unidirectional switches 32 and 37 can each consist of a MOSFET with a diode coupled in series with the drain or source thereof. The gates of the MOSFETs can be tied together. Also the resistors 31 and 36 can be tied together. Consequently, the control circuits 30 and 40 can be combined into one unit. Either SPS can also operate separately as shown hereinbelow.

Figure 4:
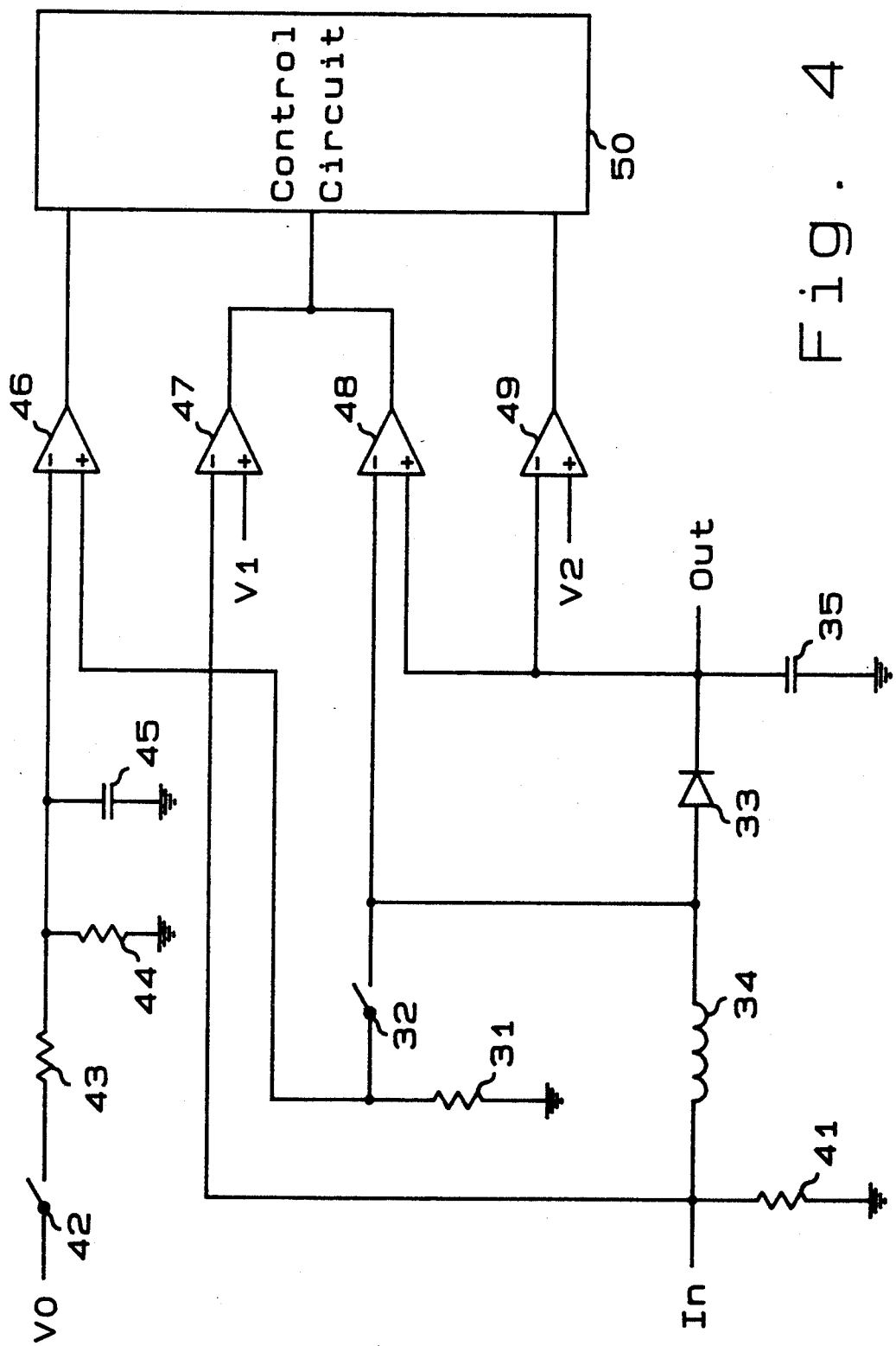
FIG. 4 is a schematic diagram of the embodiment with boost converter.

FIG. 4 is a schematic diagram of the embodiment with boost converter, i.e. boost SPS. The components 31 thru 35 are coupled and operate as the respective components of FIG. 3, having the same reference numbers. AC or pulsating DC voltage is applied to the SPS input In, wherein the switch 32 is unidirectional. It is assumed for simplicity that the SPS input signal is pulsating DC, e.g. obtained from an AC signal by a pair of diodes providing a full rectification, such as the diodes 21 and 22 of FIG. 2. N-channel MOSFET can be employed as switch 32.

The comparators 47 thru 49 monitor the input voltage, voltage across the diode 33 and output voltage respectively. Specifically, the comparator 47 compares the input voltage against the voltage V1. Similarly, the comparator 49 compares the output voltage against the voltage V2. The comparator 48 monitors the voltage across the diode 33 for determining a minimum value of the inductor current, i.e. zero current. The voltages V1 and V2 are applied to noninverting inputs of the comparators 47 and 49 respectively. The inverting inputs thereof are coupled to the input and output of the SPS respectively. The inverting and noninverting inputs of the comparator 48 are coupled to the anode and cathode of the diode 33 respectively.

Open collector outputs of the comparators 47 and 48 are tied together and provide a signal which goes high when the SPS input voltage falls below V1 and the zero inductor current is detected. Subsequently, the switch 32 is on which results in increasing current of the inductor 34. When the switch 32 is turned off, the diode 33 takes over the inductor current. The voltage across the capacitor 35 is increased when the inductor current is higher than the output current of the SPS. The output of the comparator 49 determines that the switch 32 is turned off when the capacitor voltage becomes higher than the voltage V2.

The means for determining an optimum value of the inductor current is employed to allow the SPS output voltage to reach the desired value with a minimum overshoot. The means may simply set a fixed maximum value of the inductor current, similarly to the short circuit current of FIG. 2 embodiment. In FIG. 4, the means consists of the components 31 and 42 thru 46. The inverting and noninverting inputs of the comparator 46 are coupled to a capacitive means and resistor 31 respectively. The capacitive means consists of the switch 42 and resistor 43 coupled in series with the voltage V0, and also the resistor 44 and capacitor 45 each coupled between the resistor 43 and ground. The voltage across the capacitor 45 is decreased and increased when the switch 42 is open and closed respectively. The current of the inductor 34 is charging the capacitor 35 when the switch 32 is off. However, the amount of the inductor current can be determined only when the switch 32 is on.

The switch 32 is on until the voltage across the resistor 31 has reached the value of the voltage stored in the capacitor 45. This is detected by the comparator 46 and the switch 32 is turned off accordingly. Subsequently, only if the SPS output voltage has not reached V2 and the inductor current is zero, the switch 42 is turned on to increase the capacitor voltage. Therefore, the capacitor voltage determines the optimum value of the inductor current as to minimize the overshoot of the SPS output voltage. The maximum value of the current is limited as the capacitor voltage is limited by means of the voltage V0 and resistor divider 43, 44.

The SPS is inherently synchronized by means of the comparator 47. The switch 32 can be turned on when the SPS input voltage is changing the polarity with reference to the voltage V1. The switch 32 is turned on preferably when the SPS input voltage is below V1 and the zero current is detected, whichever occurs last. Thereby, the switch 32 is turned on at zero voltage, zero current and when the SPS output voltage is below V2. The voltage V1 is positive and smaller than V2. The resistor 41 has a relatively high value and is coupled between the SPS input and ground to minimize effect of parasitic capacitances.

The control circuit 50 comprises digital components and controls the switches 32 and 42 in response to the comparators 46 thru 49. In particular, the switch 32 is turned on as determined by the comparators 47 thru 49, and is turned off as determined by the comparators 46 and 49. The switch 32 may be turned off before one pulse ends or after several pulses of the SPS input signal.

A schematic diagram of the flyback SPS may be very similar to that shown in FIG. 4. The flyback SPS is obtained essentially by exchanging the switch 32 for inductor 34, as pointed out hereinabove and clearly shown in FIG. 3. In particular, the input and output voltages of the flyback SPS have opposite polarities. Therefore, the respective voltages V1 and V2 will have opposite polarities.

Figure 5:
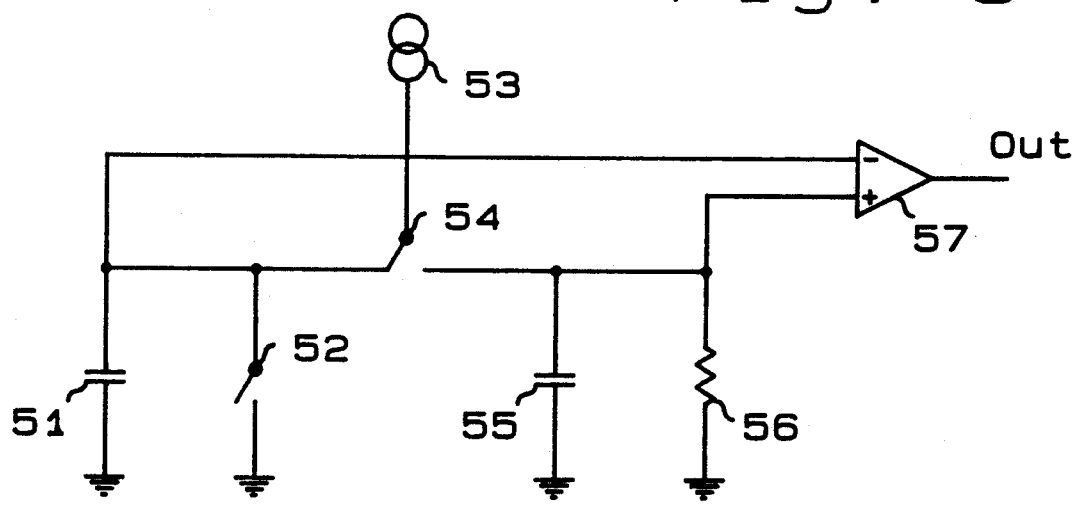
FIG. 5 is a schematic diagram of an adjustable monoflop.

FIG. 5 is a schematic diagram of an adjustable monoflop. The employment thereof is recommended in SPS based on boost or flyback converter and receiving an AC or DC pulsating input signal which has a wave form slightly changing between subsequent switchings of the SPS. For instance, the signal may be an AC square wave further fully rectified to obtain essentially DC input signal with short interruptions.

The monoflop of FIG. 5 can replace the circuit for determining an optimum value of the inductor current. An example of such a circuit is shown in FIG. 4 and consists of the components 31 and 42 thru 46. In particular, the comparator 46 compares the voltage across the resistor 31 against voltage stored in the capacitor 45. In order to minimize power dissipation of the resistor 31 a very small value thereof may be required. This may result in increased output ripple voltage at small voltages stored in capacitor 45 due to performance of real components.

The adjustable monoflop sets optimum inductor current by means of a time period during which the main switch, such as 32 of FIG. 4, conducts. No direct sensing of the inductor current takes place and so resistor 31 is superfluous. The maximum voltage across the capacitor 55 is determined by the current of the current source 53 and value of the resistor 56. Therefore, the pulse length is limited.

The capacitor 51 is zeroed when the main switch conducting the inductor current is turned on. For that purpose, the capacitor 51 is bridged by the switch 52 which is momentarily turned on. Subsequently, the current of the current source 53 is charging the capacitor 51 thru the switch 54. As a result, a linear ramp voltage is applied to the inverting input of the comparator 57.

The pulse length of the monoflop is increased when the switch 54 is momentarily switched as to apply the current of the current source 53 to the capacitor 55 and increase the voltage stored therein by a predetermined value. Otherwise, the pulse length is reduced as the capacitor 55 is discharged by the resistor 56 coupled thereacross. The capacitor 55 is coupled to the noninverting input of the comparator 57. The positive pulse provided by the comparator 57 is applied to a control circuit which also controls the switches 52 and 54.

The adjustable monoflop can be also accomplished as digital circuit in which an oscillator is coupled to a resettable unidirectional counter whose output represents the voltage of the capacitor 51. Another bidirectional counter stores a reference value representing the voltage of the capacitor 56. A digital comparator compares the counter outputs as to provide the output pulse.

Figure 6:
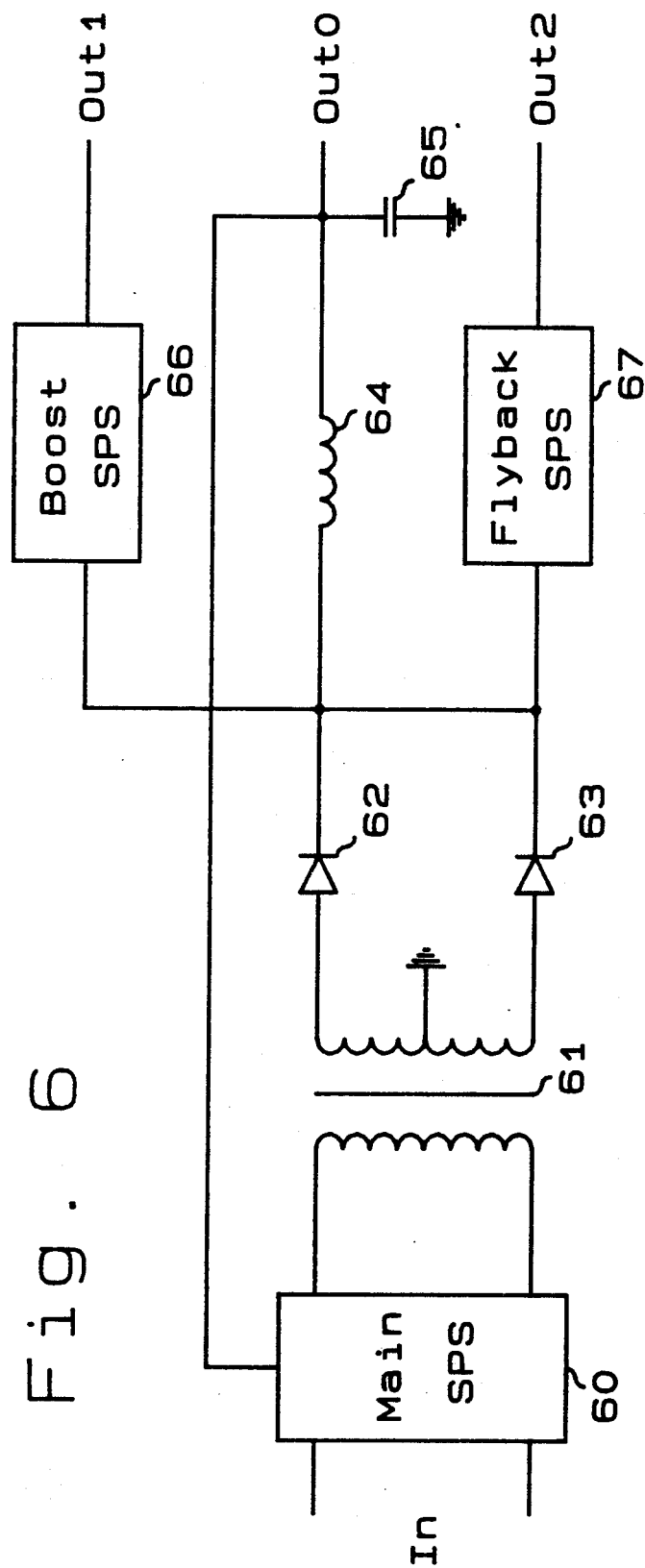
FIG. 6 is the preferred embodiment of a high efficiency power supply system requiring no minimum load, having multiple regulated outputs, isolating transformer with single secondary winding and minimum number of rectifiers.

FIG. 6 is the preferred embodiment of a high efficiency power supply system requiring no minimum load, having multiple regulated outputs, isolating transformer with single secondary winding and minimum number of rectifiers. An input signal, e.g. line, is applied to the input of the main SPS 60. The output thereof is transformed by the isolating transformer 61 having a single secondary winding with the center tap coupled to ground. This winding is further coupled to the anodes of the diodes 62 and 63 for performing the full rectification. The cathodes thereof are coupled to the output Out0 via the inductor 64. The capacitor 65 is also coupled to Out0, whereby the voltage appearing thereat is regulated by the SPS 60 thru the respective feedback.

The pulsating DC signal provided by the diodes 62 and 63 is also applied to the inputs of the boost SPS 66 and flyback SPS 67. The voltages appearing at the outputs Out1 and Out2 thereof are positive and negative respectively. The voltage at Out1 is higher than at Out0. Schematic diagram of a boost SPS is shown in FIG. 4, wherein the flyback SPS can be obtained essentially by exchanging the switch 32 for inductor 34.

No minimum output load is required. If the voltage is Out0 is too high, the energy is delivered by the capacitor 65, whereby the operation of the main SPS 60 is interrupted. In particular, the capacitor 65 provides DC voltage whose value is below V1 of FIG. 4. As a result, the voltage appearing at the inputs of the SPS 66 and 67 is pulsating due to internal switchings thereof. The boost SPS 66 and flyback SPS 67 have no input diodes so that number of diodes causing most of power losses is reduced to minimum. The total efficiency is significantly increased.

The embodiment of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power supply for converting AC or pulsating DC input signal into output signal, comprising:

a node;

a switch means responsive to a single control signal for selectively applying the input signal of one polarity to the node;

an inductive means coupled to the node for attaining a current;

a rectifying means coupled between the node and ground for conducting the current;

a capacitive means coupled between the inductive means and ground for providing the output signal;

a first comparator means for comparing the input signal against a first signal;

a second comparator means for comparing the output signal against a second signal; and a control means responsive to the first and second comparator means for providing the single control signal.

2. Switching power supply of claim 1 further including a third comparator means for determining a minimum value of the current by sensing a voltage appearing across the rectifying means, wherein the control means is responsive to the third comparator means.

3. Switching power supply of claim 1 further including:

a resistive means for obtaining a voltage in response to the current; and a third comparator means for determining an excess of the current by comparing the resistive means voltage against a third signal, wherein the control means is responsive to the third comparator means.

4. Switching power supply of claim 1 wherein the control means includes a flip-flop which is triggered and reset in responsive to the first and second comparator means respectively.

5. Switching power supply of claim 3 wherein the resistive means is coupled in series with the switch means.

* * * * *